US009353632B2

(12) United States Patent
He et al.

(10) Patent No.: US 9,353,632 B2
(45) Date of Patent: May 31, 2016

(54) AEROFOIL STRUCTURE (75) Inventors: Li He, Oxford (GB); Qiang Zhang, Oxford (GB); Andrew P Wheeler, Maidenhead (GB); Nicholas R Atkins, Cambridge (GB)

(73) Assignee: ROLLS-ROYCE plc, London (GB)

( * ) Notice: Subject to any disclaimer, the term of this patent is extended or adjusted under 35 U.S.C. 154(b) by 671 days.

(21) Appl. No.: 13/269,113

(22) Filed: Oct. 7, 2011

(65) Prior Publication Data
US 2012/0100000 A1    Apr. 26, 2012

(30) Foreign Application Priority Data

Oct. 21, 2010   (GB) .................................. 1017797.0

(51) Int. Cl.
*F01D 5/20*    (2006.01)

(52) U.S. Cl.
CPC . *F01D 5/20* (2013.01); *Y02T 50/673* (2013.01)

(58) Field of Classification Search
CPC ................................ F01D 5/20; Y02T 50/673
USPC ................. 415/173.1, 173.4, 170.1; 416/228, 416/231 R, 235, 237, 236 R
See application file for complete search history.

(56) References Cited

U.S. PATENT DOCUMENTS

| 1,568,034 | A | * | 12/1925 | Losel | 415/173.6 |
| 3,447,741 | A | * | 6/1969 | Soulez-Lariviere et al. | 415/208.2 |
| 3,575,523 | A | * | 4/1971 | Gross, Jr. | 415/171.1 |
| 3,876,330 | A | * | 4/1975 | Pearson et al. | 416/92 |
| 3,885,886 | A | * | 5/1975 | Richter | 415/116 |
| 4,150,914 | A | * | 4/1979 | Karlsson | 415/129 |
| 4,339,227 | A | * | 7/1982 | Furst | 415/182.1 |
| 4,589,823 | A | * | 5/1986 | Koffel | 416/92 |
| 4,645,417 | A | * | 2/1987 | Wisler | 415/173.1 |
| 4,957,411 | A | * | 9/1990 | Girault | 415/173.4 |
| 5,048,183 | A | * | 9/1991 | Cang et al. | 29/889.1 |
| 5,275,531 | A | * | 1/1994 | Roberts | 415/173.1 |
| 5,456,576 | A | * | 10/1995 | Lyon | 415/173.3 |
| 5,476,363 | A | * | 12/1995 | Freling et al. | 415/173.1 |
| 5,513,952 | A | * | 5/1996 | Mizuta et al. | 415/182.1 |
| 6,086,328 | A |   | 7/2000 | Lee |   |
| 6,179,556 | B1 | * | 1/2001 | Bunker | 415/115 |
| 6,435,819 | B2 | * | 8/2002 | Irie et al. | 415/119 |
| 6,450,760 | B1 | * | 9/2002 | Furukawa et al. | 415/119 |

(Continued)

FOREIGN PATENT DOCUMENTS

DE    94 22 418 U1    10/2001
EP    1 367 222 A2    12/2003

(Continued)

OTHER PUBLICATIONS

Feb. 23, 2011 Search Report issued in British Application No. GB1017797.0.

(Continued)

*Primary Examiner* — Nathaniel Wiehe
*Assistant Examiner* — Wayne A Lambert
(74) *Attorney, Agent, or Firm* — Oliff PLC (57) ABSTRACT An aerofoil structure for a rotating blade-row in a casing. The aerofoil structure includes a suction side, a pressure side and a tip therebetween. At least a portion of the tip includes a shaped feature provided on a surface of the tip. The shaped feature has a convergent portion orientated to reduce a gap between the tip and the casing in a direction from the pressure side to the suction side of the aerofoil structure.

20 Claims, 5 Drawing Sheets

(56) References Cited

U.S. PATENT DOCUMENTS

| | | | |
|---|---|---|---|
| 6,602,052 B2 * | 8/2003 | Liang | 416/97 R |
| 6,790,005 B2 | 9/2004 | Lee et al. | |
| 6,832,890 B2 * | 12/2004 | Booth | 415/173.1 |
| 7,217,101 B2 * | 5/2007 | Harvey | F01D 5/141 |
| | | | 416/223 A |
| 7,374,403 B2 * | 5/2008 | Decker | F01D 5/141 |
| | | | 416/223 A |
| 7,494,319 B1 | 2/2009 | Liang | |
| 8,657,570 B2 * | 2/2014 | Kray et al. | 415/173.4 |
| 8,790,088 B2 * | 7/2014 | Dyer | F01D 5/20 |
| | | | 416/223 R |
| 2003/0123987 A1 * | 7/2003 | Longet | 416/223 R |
| 2005/0220627 A1 * | 10/2005 | Goodman | 416/235 |
| 2007/0077149 A1 * | 4/2007 | Lejars et al. | 416/223 R |
| 2007/0224049 A1 * | 9/2007 | Itzel et al. | 416/241 R |
| 2010/0135822 A1 | 6/2010 | Marini et al. | |
| 2011/0091327 A1 * | 4/2011 | Willett, Jr. | 416/235 |
| 2013/0149163 A1 * | 6/2013 | Parkos, Jr. | F01D 5/20 |
| | | | 416/224 |
| 2014/0010650 A1 * | 1/2014 | Zelesky | F01D 5/18 |
| | | | 416/1 |
| 2014/0186190 A1 * | 7/2014 | Zelesky | F01D 5/187 |
| | | | 416/97 R |

FOREIGN PATENT DOCUMENTS

| | | |
|---|---|---|
| EP | 1 764 478 A2 | 3/2007 |
| FR | 2 891 003 A1 | 3/2007 |
| GB | 1107024 A | 3/1968 |
| GB | 2 282 856 A | 4/1995 |
| JP | A-7-026904 | 1/1995 |
| JP | A-9-013904 | 1/1997 |
| JP | A-11-201092 | 7/1999 |

OTHER PUBLICATIONS

Nov. 29, 2011 European Search Report issued in European Patent Application No. 11 18 4088.

* cited by examiner

AEROFOIL STRUCTURE

This disclosure relates to an aerofoil structure and particularly but not exclusively relates to an aerofoil structure tip profile for a rotating blade-row.

The tip geometries of High pressure (HP) turbine rotor blades for a gas turbine engine may typically be shrouded, un-shrouded or partially shrouded, e.g. in the case of a turbine blade having a winglet on its tip. The present disclosure relates to un-shrouded or partially shrouded blade tips since there is the potential for significant improvements to be made in their performance, particularly for highly loaded HP blades. For example, it is well known that gas turbine engine efficiencies are reduced by hot expanding combustion gases leaking across a gap between the tip of rotating turbine blades and the surrounding casing. The provision of a seal between these members is particularly difficult in a turbine due to the high temperatures and centrifugal loads encountered.

For all existing rotor tip configurations, regardless of geometry variations, a common feature exists: there is always a significant portion of flat surface with a minimum and constant gap distance from the stationary casing or shroud. It is this constant distance by which tip clearance is commonly defined. From an aero-thermal point of view, a fundamental feature of existing configurations is that the performance (flow loss and heat load) is to a great extent determined by what happens at the bounding edges of the tip gap, i.e. the flow conditions at the pressure surface side (inflow) and suction surface side (outflow) of the tip gap. This by itself also leads to a rather simple (and one of most widely studied) control parameter, the tip clearance gap (which is nominally assumed to be a constant). It is presently presumed that the tip clearance gap is the most influential parameter.

Figure 1:
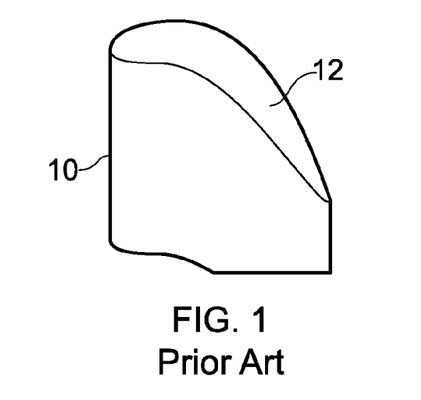
FIG. 1 shows a first prior art aerofoil structure with a flat tip geometry.
Figure 2:
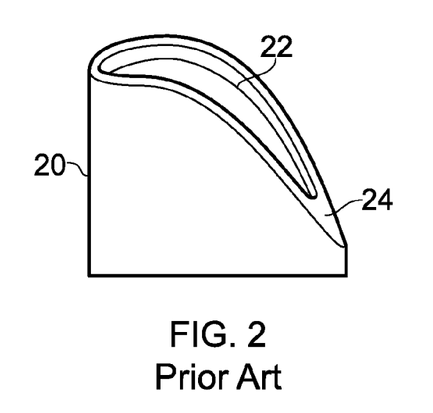
FIG. 2 shows a second prior art aerofoil structure with a squealer tip geometry.
Figure 3:
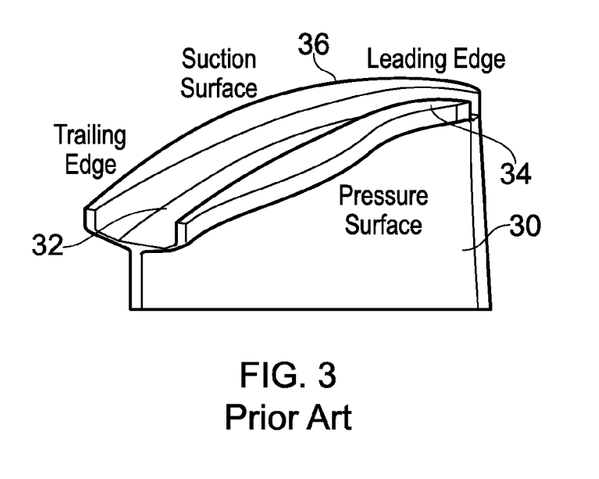
FIG. 3 shows a third prior art aerofoil structure with a winglet tip geometry.

As shown in FIG. 1, the simplest un-shrouded rotor blade tip 12 of a rotor blade 10 is a flat tip geometry. However, a flat tip design is typically associated with a considerable aerodynamic and heat loss due to the over-tip leakage flow. To this end other blade tip configurations have been proposed with the aim of reducing the over-tip leakage flows and losses. For example, the blade 20 shown in FIG. 2 comprises an open ended plenum 22 provided on the blade tip 24. This example is typically referred to as a 'squealer'. A further example is shown in FIG. 3. The blade 30 in this example comprises a channel 32 provided between protrusions 34, 36 on the pressure and suction surfaces respectively and is typically referred to as a 'winglet'. In either example, the function of the cavity or channel is to trap gas which leaks past the peripheral wall on the pressure side of the blade. The trapped gas forms a vortex within the cavity or channel which inhibits the flow continuing to the suction side. These configurations serve to avoid losses in efficiency caused by gas and/or heat leakage over the turbine blade tips and also to avoid losses caused by flow disturbances set up by the leakage flow. However, a disadvantage of these configurations is that they are complex and as a result are difficult to manufacture. Furthermore, the increased surface area associated with these configurations usually leads to an increased heat load and it is difficult to achieve effective cooling of these blade configurations.

The present invention therefore seeks to address these issues.

Thus there is provided an aerofoil structure having a longitudinal axis, a suction side, a pressure side and a tip therebetween, wherein at least a portion of the tip comprises a shaped feature provided on a surface of the tip, the shaped feature having a first surface which is angled outwardly from the surface of the tip in a direction from the pressure side to the suction side of the aerofoil structure, the angle is up to 10°.

The shaped feature may have a second surface which is angled outwardly from the surface of the tip in a direction from the suction side to the pressure side of the aerofoil structure, the angle is up to 10°.

The shaped feature may have a transition surface between the first and second surfaces.

One or more of the surfaces may be angled between 2° and 10° inclusive.

One or more of the surfaces may be angled between 2° and 7°.

One or more of the surfaces may be angled at approximately 4°.

One or more of the surfaces may be angled at a different angle to the other surfaces.

The first and second surfaces may have an angled length and the angled length of the first and second are different.

Either one or all the first, second and transition surfaces may be curved.

The curve may be either one or more of the group consisting of convex and concave.

Either one or both the first and second surfaces may be stepped away from the pressure or suction sides.

In another aspect a rotor assembly comprising the aerofoil as described above and a casing, the casing surrounding the aerofoil and defining a gap therebetween, the gap is convergent from the pressure side towards the suction side.

The gap may be convergent adjacent the first surface and then divergent adjacent the second surface to at least partially forms a convergent-divergent nozzle for a flow over said portion of the tip.

A gas turbine engine may comprise the aerofoil as described above.

A gas turbine engine may comprise the rotor assembly as described above.

Accordingly there is provided an aerofoil structure for a rotating blade-row in a casing, the aerofoil structure comprising a suction side, a pressure side and a tip therebetween, wherein at least a portion of the tip comprises a shaped feature provided on a surface of the tip, the shaped feature comprising a convergent portion orientated to reduce a gap between the tip and the casing in a direction from the pressure side to the suction side of the aerofoil structure.

The shaped feature may be configured to accelerate a flow, e.g. a subsonic flow, over said portion of the tip. The shaped feature may accelerate said flow over the tip, or at least a portion thereof, to supersonic or transonic speeds.

The accelerated flow may reduce the rate at which heat may be transferred over the tip of the aerofoil structure. For example, the accelerated flow may reduce the local heat transfer coefficient.

The shaped feature may at least partially form a convergent-divergent nozzle for a flow over said portion of the tip. The convergent-divergent nozzle may be further formed, at least in part, by a shroud or casing surrounding the rotating blade-row, e.g. when the aerofoil structure is in an installed configuration.

The shaped feature may further comprise a divergent portion, which may be provided on the surface of the tip. The divergent portion may be provided downstream of the convergent portion.

The shaped feature may comprise a first angled portion, which may be adjacent to the pressure side of the aerofoil structure. The first angled portion may form the convergent portion. The first angled portion and or convergent portion may be arranged to be acutely angled, such as for example in the form of a slope or ramp, relative to a casing surrounding the blade row.

The shaped feature may comprise a second angled portion, which may be adjacent to the suction side of the aerofoil structure. The second angled portion may form the divergent portion. The shaped feature may further comprise an intermediate or raised portion, which may be provided between the first and second angled portions. The intermediate portion may take the form or a land adjoining at least the first angled portion.

The shaped feature may comprise a curved profile. For example, the surface of the tip may comprise a convex curve, e.g. extending from the pressure side to the suction side. The curved profile may form the convergent and divergent portions.

The aerofoil structure may further comprise a transition portion provided on the surface of the tip. The transition portion may be provided between the shaped feature and the remainder of the tip.

The shaped feature may be provided at or towards the leading edge of the aerofoil structure. The shaped feature may be provided at up to 25 to 30% of the aerofoil structure chord. The shaped feature may alternatively be located at any chord-wise point along the aerofoil structure tip, e.g. at a location with a subsonic flow over the tip.

The aerofoil structure may be arrangeable such that the gap may be formed between the tip and a shroud or casing surrounding the rotating blade-row, e.g. when the aerofoil structure is in an installed configuration.

Accordingly there is provided a casing for a rotating blade-row of one or more aerofoil structures, the aerofoil structures comprising a suction side, a pressure side and a tip therebetween, wherein the casing comprises a shaped feature provided on a surface of the casing facing a portion of the aerofoil structure tip, the shaped feature comprising a convergent portion orientated to reduce a gap between the tip and the casing in a direction from the pressure side to the suction side of the aerofoil structure.

The shaped feature may comprise an annulet provided on an inner surface of the casing. The casing shaped feature may be provided in conjunction with a shaped feature on the aerofoil structure, e.g. curved tip edges. The casing and aerofoil structure tip may together form a convergent-divergent nozzle. The shaped feature may locally reduce the cross-sectional area for an over tip flow such that the flow is accelerated. The heat transfer rate may thus be reduced.

According there is provided an aerofoil structure for a rotating blade-row, the aerofoil structure comprising a suction side, a pressure side and a tip therebetween, wherein at least a portion of the tip comprises a shaped feature, e.g. a convergent portion, provided on a surface of the tip, the shaped feature being configured to accelerate a flow over said portion of the tip.

According there is provided a casing for a rotating blade-row of one or more aerofoil structures, the aerofoil structures comprising a suction side, a pressure side and a tip therebetween, wherein the casing comprises a shaped feature, e.g. a convergent portion, provided on a surface of the casing facing a portion of the aerofoil structure tip, the shaped feature being configured to accelerate a flow over said portion of the tip.

A high pressure turbine blade may consist of the above-described aerofoil structure. A gas turbine engine or turbomachine may comprise the above-described aerofoil structure or casing.

For a better understanding of the present invention, and to show more clearly how it may be carried into effect, reference will now be made, by way of example, to the accompanying drawings, in which:—

FIG. 6 shows experimental results of heat transfer coefficients distributed on a tip surface for a flat tip (FIG. 6(a)) and a shaped tip (FIG. 6(b))

Figure 4A:
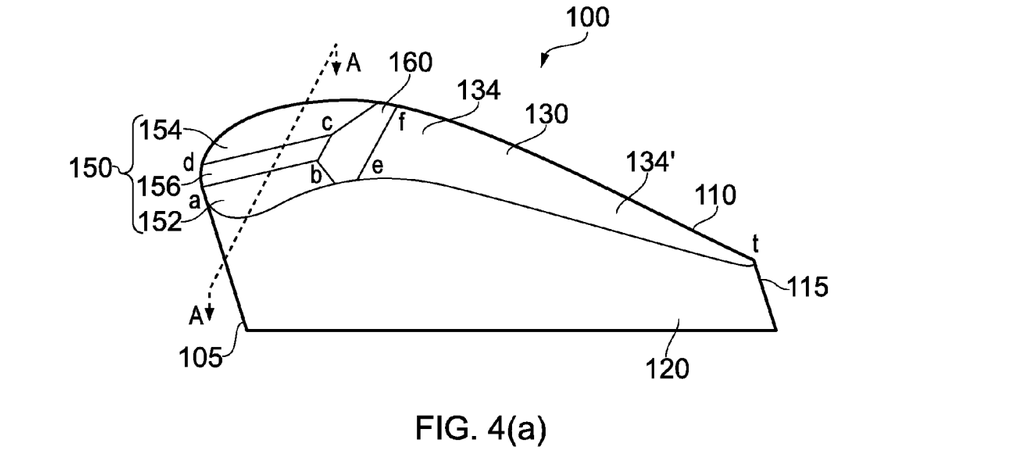
FIG. 4(a) is a perspective view showing a tip of an aerofoil structure according to a first example of the present disclosure and FIG. 4(b) is a sectional view along line AA as shown in FIG. 4(a)
Figure 4B:
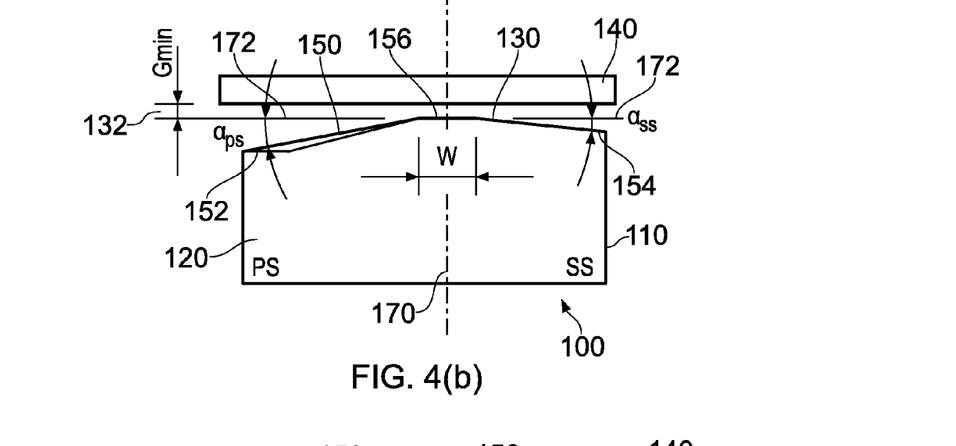

With reference to FIGS. 4(a) and 4(b), an aerofoil structure 100 according to an example of the present disclosure, may comprise a suction side 110, a pressure side 120 and a tip 130 therebetween. The aerofoil structure 100 may be a High Pressure turbine rotor blade and may be without a shroud. In an installed configuration, the aerofoil structure 100 may extend radially from a shaft (not shown) towards a casing 140. A gap 132 may exist between the tip 130 of the aerofoil structure and the casing 140.

A portion of the tip 130 may comprise a shaped feature 150 provided on a surface 134 of the tip 130. The shaped feature 150 may be configured to accelerate a subsonic flow, e.g. upstream of the shaped feature, over said portion of the tip. In the particular example shown, the shaped feature may comprise one or more planar surfaces. For example, the shaped feature 150 may comprise a first portion or surface 152 adjacent to the pressure side 120 of the aerofoil structure and a second portion or surface 154 adjacent to the suction side 110 of the aerofoil structure. The shaped feature may further comprise a raised portion or transition surface 156, e.g. a flat platform (further denoted as a-b-c-d in FIG. 4(a)), which may be provided between the first and second angled portions 152, 154. As can be seen in FIG. 4(b), the first surface 152 is angled with respect to a plane 172 to which a radial line 170 is normal. The radial line 170 radiates from a rotational axis of a gas turbine engine, typically, where the blade is used. The radial line can also be described as a longitudinal axis which generally runs in the direction of span of the aerofoil. The second surface 154 may also be angled with respect to the plane 172.

As shown in FIG. 4(b), the raised portion 156 may have a width W, which may be relatively small with respect to the thickness of the aerofoil structure, i.e. the distance from the suction side to the pressure side. The chord-wise dimension of the raised portion 156 may be greater than the width W. In an alternative example (not shown) the raised portion 156 may be omitted altogether.

As shown in FIG. 4(b), the raised portion 156 may be substantially flat and may be substantially parallel to a tangent of the casing 140 opposite the raised portion 156. The raised portion may be provided at a distance $G_{min}$ from the casing 140 and this may define the minimum tip gap 132 between the surface 134 of the tip and the casing 140. The first angled portion 152 may be substantially flat and may be angled with respect to the raised portion by $\alpha_{ps}$. The second angled portion 154 may be substantially flat and may be angled with respect to the raised portion by $\alpha_{ss}$. The angles $\alpha_{ps}$ and $\alpha_{ss}$ may be equal or one may be greater in magnitude than the other.

Thus the shaped feature has a first surface 152 which is angled (radially) outwardly from the surface of the tip in a direction from the pressure side to the suction side of the aerofoil structure. The shaped feature has a second surface which is angled outwardly from the surface of the tip in a direction from the suction side to the pressure side of the aerofoil structure. The angles of the first and second surfaces, $\alpha_{ps}$ and $\alpha_{ss}$ are greater than zero and can be up to 10°. It is believed that angles $\alpha_{ps}$ and $\Delta_{ss}$ become particularly beneficial between 2° and 10°. A range of suitable angles $\alpha_{ps}$ and $\alpha_{ss}$ is between 2° and 7°. One specific angle is approximately 4°. Not only can the angles $\alpha_{ps}$ and $\alpha_{ss}$ be different, but also the lengths of the surfaces 152, 154 in the direction between e and f on FIG. 4(a), can be different. 8. Thus in FIG. 4(b) the first and second surfaces can have an angled length of their surfaces 152, 154 which are different. In one embodiment the first angled surface is longer than the second angled surface.

Figure 4C:
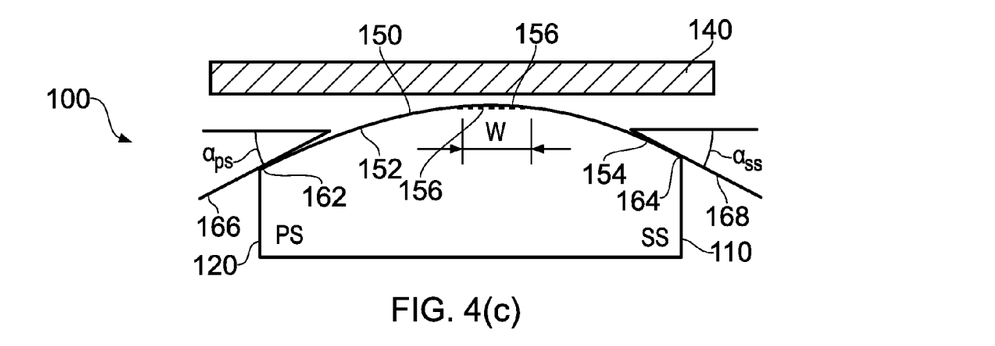
FIG. 4(c) is a sectional view along line AA as shown in FIG. 4(a) according to a second example of the present disclosure.

As shown in FIGS. 4(a) to 4(c) the first and second surfaces meet the pressure and suction sides at edges 162 and 164 respectively. However, either one or both the first and second surfaces can be stepped away from the pressure or suction sides.

The aerofoil structure 100 may further comprise a transition portion 160 (further denoted as c-b-e-f in FIG. 4(a)), provided on the surface 134 of the tip 130. The transition portion 160 may be provided between the shaped feature 150 and a remainder of the tip surface 134' (further denoted as e-f-t in FIG. 4(a)). The transition portion 160 may provide a transition from the contours of the shaped feature 150 to the remainder of the tip surface 134'. The transition portion 160 may be substantially flat. The remainder of the tip surface 134' may be substantially flat. The remainder of the tip surface 134' may be substantially parallel to a tangent of the casing 140 opposite the remainder of the tip surface. The gap between the remainder of the tip surface 134' and the casing 140 may be greater than or equal to the minimum gap $G_{min}$ between the shaped feature 150 and the casing 140. The gap between the remainder of the tip surface 134' and the casing 140 may be referred to as the "nominal gap".

The shaped feature 150 may be provided at or towards a leading edge 105 of the aerofoil structure 100. The shaped feature may be provided at up to 30% of the aerofoil structure chord between the leading edge 105 and a trailing edge 115.

The shaped feature 150 may be manufactured by providing a plane cut to the tip surface to form the raised portion 156; and providing plane cuts from the pressure and suction sides to form the first and second angled portions 152, 154. These plan cuts may be provided in any order. Furthermore, having determined the desired nominal tip gap clearance, a plane cut may be provided to form the remainder of the tip surface 134'. A plane cut to form the transition portion 160 may also be provided from the frontal minimum tip gap region (a-b-c-d) to the high-speed nominal gap region (e-f-t).

Figure 4D:
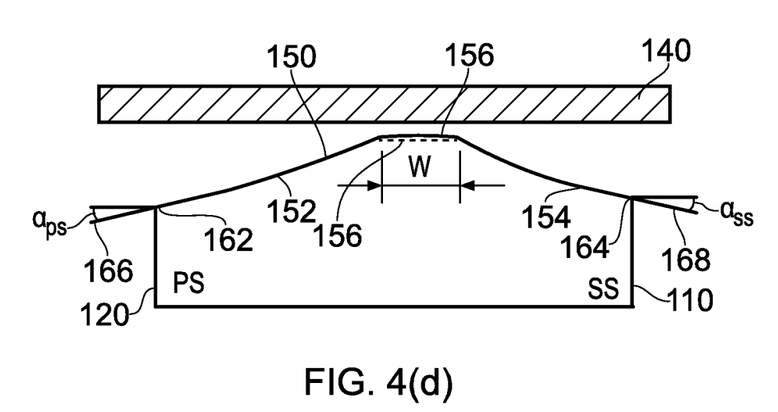
FIG. 4(d) is a sectional view along line AA as shown in FIG. 4(a) according to a third example of the present disclosure.

Alternatively, the shaped feature may comprise a curved profile with any curved shape. For example, the surface of the tip may comprise a convex curve. The curved profile may form the convergent and divergent portions. A curved profile may be used in combination with straight edged portions. For example, the first and second angled portions 152, 154 may be replaced with curved sections and the flat raised portion may be provided therebetween. Alternatively, the flat sections may be omitted altogether and the convergent-divergent nozzle may be formed of a single convex curve. Where a curved profile is used, shown in FIG. 4(c), the angles $\alpha_{ps}$ and $\alpha_{ss}$ are with respect to a tangent 166, 168 at a free edge 162, 164 between the aerofoil surfaces 120 and 110. The straight edge portion 156 is shown dashed, but as mentioned earlier a continuous curve may be used. The curve may be formed of a number of different curves being complex or of single radius. For example surface 152 may have a longer radius than surface 154. The curves can be complex curves for example a spline. The curve can be convex or concave, as shown in FIG. 4(d).

As shown in FIG. 4(b), the shaped feature 150, together with the casing 140, forms a convergent-divergent nozzle for the over tip flow from the pressure side 120 to the suction side 110. The convergent-divergent nozzle may promote choking of the flow inside the tip gap. Such choking may control the over-tip mass flow. Furthermore, the convergent-divergent nozzle may accelerate the flow, e.g. to transonic or supersonic conditions. Without the shaped feature 150 the flow over said portion of the tip may otherwise be subsonic.

The present disclosure provides for modification of the geometry of the otherwise flat tip surface to accelerate the local flow to give a significant heat load reduction. The overtip shaping may also provide a potential effective means to control and manipulate heat load distribution (and hence thermal stress) over the aerofoil structure tip surface. The proposed tip-shaping may also provide potential for promoting choking inside the tip gap as a way to control the over-tip mass flow.

It is known that the over-tip flow may be highly transonic for high pressure turbine blades under realistic flow conditions and it is also known that the supersonic part has noticeably lower heat transfer than the subsonic part (see for example Wheeler, Atkins and He, "Turbine blade tip Heat transfer in low speed and high speed flows", ASME GT2009-59404). Thus, by accelerating the subsonic flow over the tip to supersonic conditions, the present disclosure can reduce the heat transfer rate over the tip of the aerofoil structure.

Given the qualitatively different heat transfer characteristics for a high speed over-tip flow and the high sensitivity of a transonic flow to small geometrical variations in general, the idea behind the present disclosure is to shape the over-tip geometry (which is of a constant gap distance in the existing configurations) in order to accelerate the low speed (high heat load) part to a higher speed (lower heat load). As such, the over-tip geometry shaping can be used to generate and control the local transonic flow pattern resulting in a more desirable heat load level and distribution.

By shaping the tip surface to accelerate subsonic flow to supersonic speeds, the present disclosure is able to manage heat load over the tip surface more effectively than a simple control of a constant tip clearance gap can. The maximum potential in the over-tip heat load management may not be achieved by simply varying the tip gap clearance as a sole control parameter.

Figure 5:
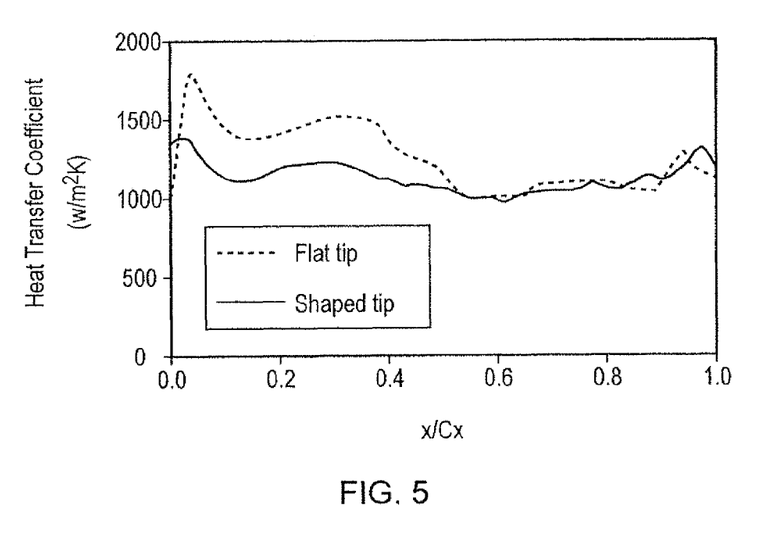
FIG. 5 shows experimental results of heat transfer coefficients axially distributed and tangentially area-averaged.

With reference to FIGS. 5 and 6 the results for a test case carried out on a linear cascade are shown. The test has been carried out on for a high pressure turbine blade at a realistic transonic flow condition (e.g. exit Mach number≈1; exit Reynolds number≈$1\times10^6$). The shaped feature as shown in FIG. 4 has been applied to the frontal part (e.g. up to 25-30% chord) of the tip surface with the following parameters:

nominal tip gap (e-f-t region, FIG. 4(a)): 1% blade span
minimum tip gap ($G_{min}$, FIG. 4(b)): 0.5% blade span
first angled portion angle ($\alpha_{ps}$, FIG. 4(b)): 4°
second angled portion angle ($\alpha_{ss}$, FIG. 4(b)): 4°
transition portion angle relative to chord (c-d-e-f, FIG. 4(a)): 3°

The resulting heat transfer coefficients are shown in FIGS. 5 and 6 and they are consistently in support of the advantages of the present disclosure. (The experimental results also agree favourably with CFD predictions.) For example, FIG. 5 shows the experimental results of an axial distribution of tangentially area-averaged heat transfer coefficients for a flat tip baseline case (dotted line) and for a shaped blade tip under the transonic flow condition (solid line). The heat transfer coefficient is reduced at the front end of the blade where the shaped feature is provided and the flow is accelerated from subsonic to supersonic or transonic conditions.

Figure 6A:
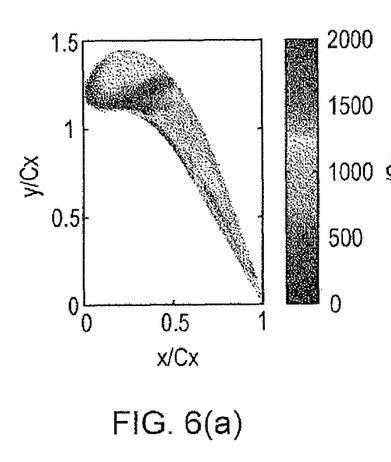
Figure 6B:
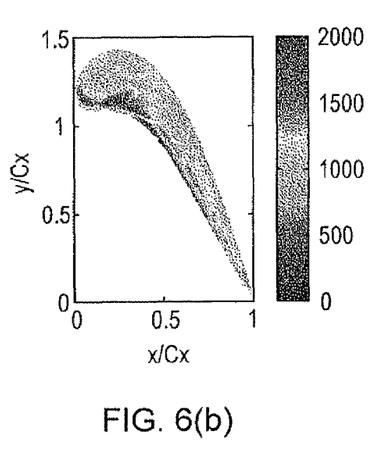

FIG. 6 compares the experimental results of heat transfer coefficients distributed on a flat tip surface (FIG. 6(a)) and a shaped tip surface (FIG. 6(b)). The contours shown in FIG. 6 represent the local heat transfer coefficients and the value of the heat transfer coefficients is indicated in the adjacent key. As is shown, the high heat transfer coefficient regions towards the front end of the flat tip are reduced in size and intensity with the shaped tip.

The present disclosure enables a more effective management of the tip heat transfer rate than only varying and controlling a global constant tip gap, as in the existing designs. Compared to the prior art, this invention reduces blade tip heat load by control of the local acceleration of the tip gap flow through shaping of the tip.

A further advantage of the present disclosure is that by having a smaller region with the minimum tip clearance gap, the control of the tip clearance should become easier in general.

The present disclosure (e.g. channelling the over-tip flow with convergent-divergent like ducting) is not limited to the leading edge region of the tip. The concept may be applicable to other areas of a tip gap to control and manipulate heat load. The concept may also be applied to more sophisticated geometries (e.g. squealer and winglet).

Figure 7:
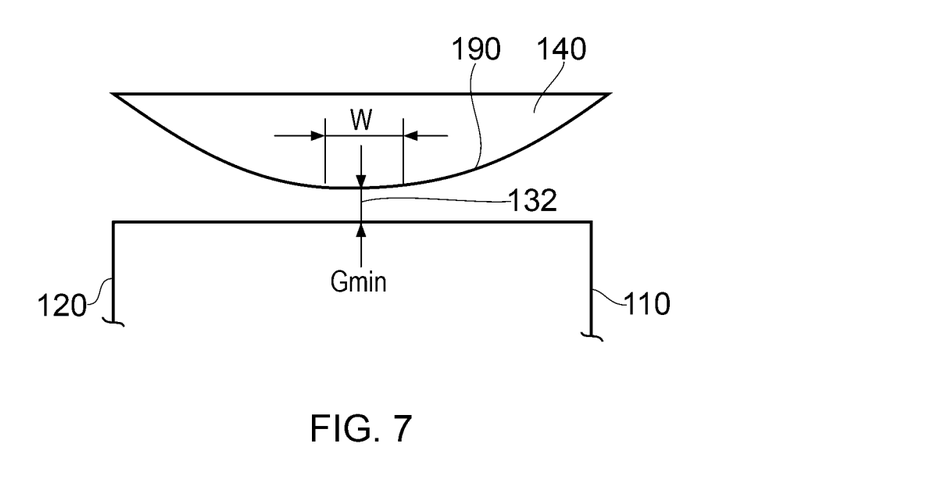
FIG. 7 shows a sectional view of a turbine assembly according to a fourth example of the present disclosure.

In a further example (shown in FIG. 7) a casing 140 may comprise a shaped feature provided on a surface of the casing, e.g. facing a portion of the aerofoil structure tip. The shaped feature may be configured to accelerate a subsonic flow to a supersonic flow over said portion of the tip. The shaped casing feature may comprise an annulet 190 provided on an inner surface of the casing 140. The casing shaped feature may be provided in conjunction with a shaped feature on the aerofoil structure, e.g. curved tip edges. The casing and aerofoil structure tip may together form a convergent-divergent nozzle. The shaped feature may locally reduce the cross-sectional area for an over tip flow such that the flow is accelerated. The heat transfer rate may be reduced by the same mechanism as described above.

The present disclosure may be applied to gas turbines, e.g. land based, or jet engines or any other turbomachinery, for example a steam turbine.

The invention claimed is:

1. A turbine assembly comprising a turbine blade and a casing, the casing surrounding the turbine blade and defining a gap therebetween, the turbine blade having a longitudinal axis, a suction side, a pressure side and a tip extending between the pressure and suction sides, wherein at least a portion of the tip comprises a shaped feature provided on a surface of the tip, the shaped feature having a first surface extending from the pressure side which is angled in a direction from the pressure side to the suction side with respect to a tangent at a free edge and with respect to a plane to which the longitudinal axis is normal to define a convergent portion configured to accelerate a flow over a portion of the tip in use from a subsonic speed to a transonic or a supersonic speed, wherein the shaped feature comprises a second surface angled up to 10° with respect to the plane to which the longitudinal axis is normal, wherein the shaped feature comprises a minimum tip gap between the shaped feature and the casing, and a remainder of the tip surface comprises a nominal tip gap between the remainder of the tip surface and the casing, the nominal tip gap being greater than the minimum tip gap, and wherein a ratio of the nominal tip gap to the minimum tip gap is 2:1.

2. The turbine assembly as claimed in claim 1, the shaped feature having a transition surface between the first and second surfaces.

3. The turbine assembly as claimed in claim 2, wherein one or more of the surfaces is angled at a different angle to the other surfaces.

4. The turbine assembly as claimed in claim 2, wherein the transition surface is curved.

5. The turbine assembly as claimed in claim 1, wherein one or more of the surfaces are angled between 2° and 10° inclusive.

6. The turbine assembly as claimed in claim 1, wherein one or more of the surfaces are angled between 2° and 7°.

7. The turbine assembly as claimed in claim 1, wherein one or more of the surfaces are angled at approximately 4°.

8. The turbine assembly as claimed in claim 1, wherein one or more of the surfaces is angled at a different angle to the other surfaces.

9. The turbine assembly as claimed in claim 1, wherein the first and second surfaces have an angled length and the angled length of the first and second surfaces are different.

10. The turbine assembly as claimed in claim 1, wherein the first surface is curved.

11. The turbine assembly as claimed in claim 10, wherein the curve is either convex or concave.

12. The turbine assembly as claimed in claim 1, wherein the second surface is curved.

13. The turbine assembly as claimed in claim 1, wherein the gap is convergent adjacent the first surface and then divergent adjacent the second surface to at least partially forms a convergent-divergent nozzle for a flow over said portion of the tip.

14. A gas turbine engine comprising the turbine assembly of claim 1.

15. The turbine assembly as claimed in claim 1, the shaped feature having a transition surface between the first and second surfaces.

16. The turbine assembly as claimed in claim 1, wherein the shaped feature is provided at or towards a leading edge of the blade.

17. The turbine assembly as claimed in claim 16, wherein the shaped feature is provided at no more than 30% of a chord of the turbine blade from the leading edge to the trailing edge.

18. A turbine assembly comprising a turbine blade and a casing, the casing surrounding the turbine blade and defining a tip gap therebetween, the turbine blade having a longitudinal axis, a suction side, a pressure side and a tip extending between the pressure and suction sides, wherein at least a portion of the tip comprises a shaped feature provided on a surface of the tip, the shaped feature being provided at no more than 30% of the aerofoil structure chord between a leading edge and a trailing edge, the shaped feature having a first surface extending from the pressure side which is angled in a direction from the pressure side to the suction side with respect to a tangent at a free edge and with respect to a plane to which the longitudinal axis is normal to define a convergent portion, and a second surface angled up to 10° with respect to the plane to which the longitudinal axis is normal, the shaped feature being configured to accelerate a flow over a portion of the tip in use from a subsonic speed to a transonic or a supersonic speed, wherein the shaped feature comprises a minimum tip gap between the shaped feature and the casing, and a remainder of the tip surface comprises a nominal tip gap between the remainder of the tip surface and the casing, the nominal tip gap being greater than the minimum tip gap, and wherein a ratio of the nominal tip gap to the minimum tip gap is 2:1.

19. A turbine assembly comprising a turbine blade and a casing, the casing surrounding the turbine blade and defining a gap therebetween, the turbine blade having a longitudinal axis, a suction side, a pressure side and a tip extending between the pressure and suction sides, wherein at least a portion of the tip comprises a shaped feature provided on a surface of the tip, the shaped feature having a first surface extending from the pressure side which is angled in a direction from the pressure side to the suction side with respect to a tangent at a free edge and with respect to a plane to which the longitudinal axis is normal to define a convergent portion configured to accelerate a flow over a portion of the tip in use from a subsonic speed to a transonic or a supersonic speed, wherein the shaped feature comprises a second surface angled up to 10° with respect to the plane to which the longitudinal axis is normal, wherein the shaped feature comprises a minimum tip gap between the shaped feature and the casing, and a remainder of the tip surface comprises a nominal tip gap between the remainder of the tip surface and the casing, the nominal tip gap being greater than the minimum tip gap, and wherein the nominal tip gap is 1% of blade span, and the minimum tip gap is 0.5% of blade span.

20. A turbine assembly comprising a turbine blade and a casing, the casing surrounding the turbine blade and defining a tip gap therebetween, the turbine blade having a longitudinal axis, a suction side, a pressure side and a tip extending between the pressure and suction sides, wherein at least a portion of the tip comprises a shaped feature provided on a surface of the tip, the shaped feature being provided at no more than 30% of the aerofoil structure chord between a leading edge and a trailing edge, the shaped feature having a first surface extending from the pressure side which is angled in a direction from the pressure side to the suction side with respect to a tangent at a free edge and with respect to a plane to which the longitudinal axis is normal to define a convergent portion, and a second surface angled up to 10° with respect to the plane to which the longitudinal axis is normal, the shaped feature being configured to accelerate a flow over a portion of the tip in use from a subsonic speed to a transonic or a supersonic speed, wherein the shaped feature comprises a minimum tip gap between the shaped feature and the casing, and a remainder of the tip surface comprises a nominal tip gap between the remainder of the tip surface and the casing, the nominal tip gap being greater than the minimum tip gap, and wherein the nominal tip gap is 1% of blade span, and the minimum tip gap is 0.5% of blade span.

* * * * *